United States Patent [19]

Swanson

[11] 4,290,450
[45] Sep. 22, 1981

[54] FLUID MIXING VALVE

[75] Inventor: Wesley S. Swanson, Elk Grove Village, Ill.

[73] Assignee: Eaton Corporation, Cleveland, Ohio

[21] Appl. No.: 24,751

[22] Filed: Mar. 28, 1979

[51] Int. Cl.³ .......................................... F16K 19/00
[52] U.S. Cl. ................................................... 137/606
[58] Field of Search .................. 137/606, 607; 4/192, 4/193, 194

[56] References Cited

U.S. PATENT DOCUMENTS

| | | | |
|---|---|---|---|
| 2,453,409 | 11/1948 | Chace | 137/606 X |
| 2,503,901 | 4/1950 | Chace | 137/606 X |
| 2,542,279 | 2/1951 | Kempton | 137/606 |
| 2,908,285 | 10/1959 | Bochan | 137/517 X |
| 2,935,079 | 5/1960 | Shelton | 137/606 X |
| 3,047,014 | 7/1962 | Kovach | 137/607 |
| 3,167,091 | 1/1965 | Holdren | 137/606 X |
| 3,830,256 | 8/1974 | Cox | 137/606 X |

Primary Examiner—Robert G. Nilson
Attorney, Agent, or Firm—R. J. McCloskey; R. A. Johnston

[57] ABSTRACT

A fluid mixing valve is disclosed having three pressure operated pilot controlled solenoid operated valves (12, 14, 16) mounted on a unitary valve housing (10) which defines a primary fluid passageway (74) an outlet (76), and two inlet fluid passageways (81, 85) connectable to separate pressurized fluid sources. The solenoid valves selectively control fluid flow from the inlet passageways to the primary passageway which also functions as a mixing chamber. Flow control orifices (78, 80, 82) integrally molded into the valve housing are disposed intermediate the primary fluid passageway and the respective inlet passageways for limiting the flow rate to the outlet.

4 Claims, 7 Drawing Figures

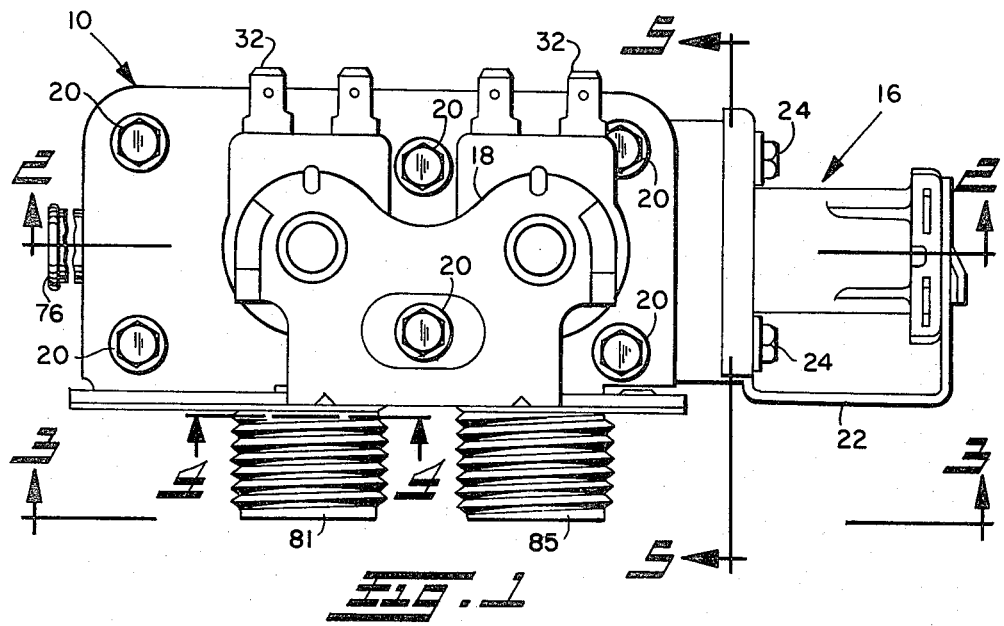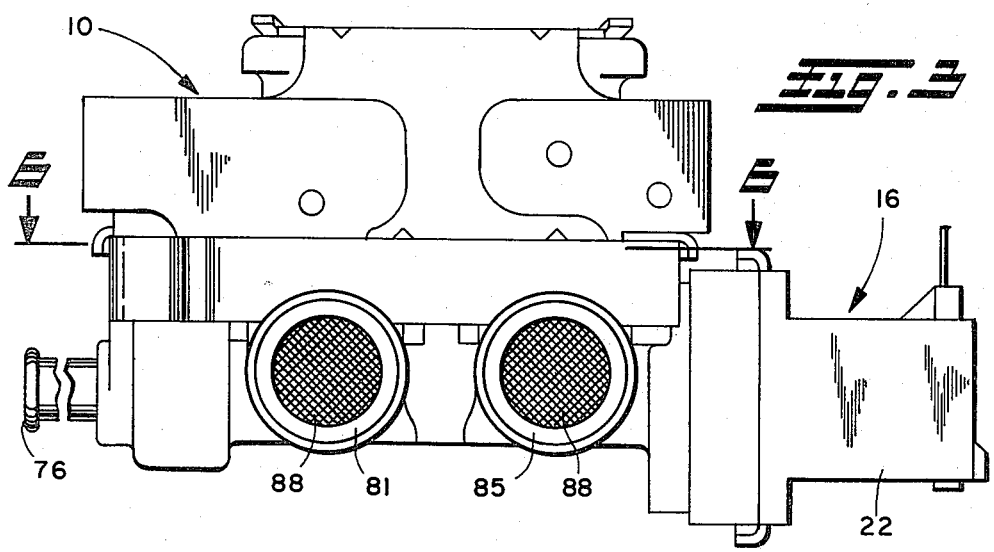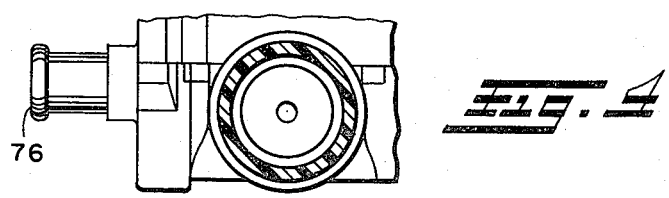

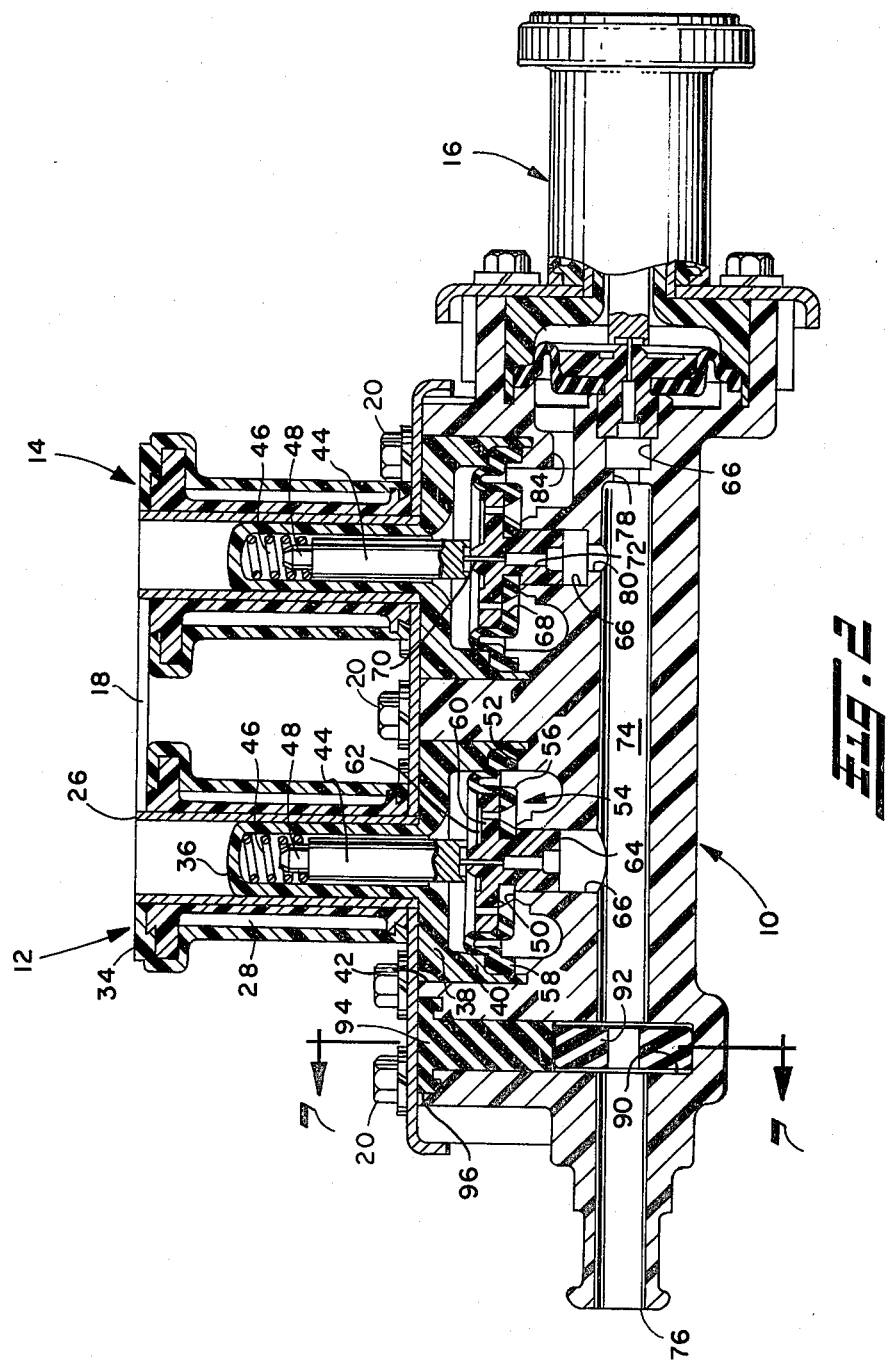

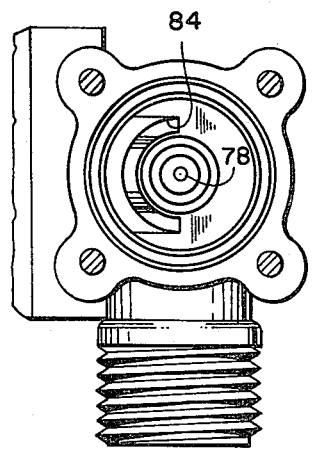
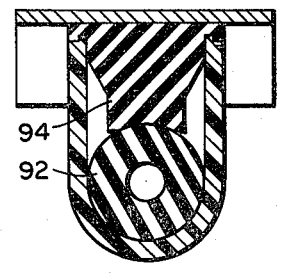
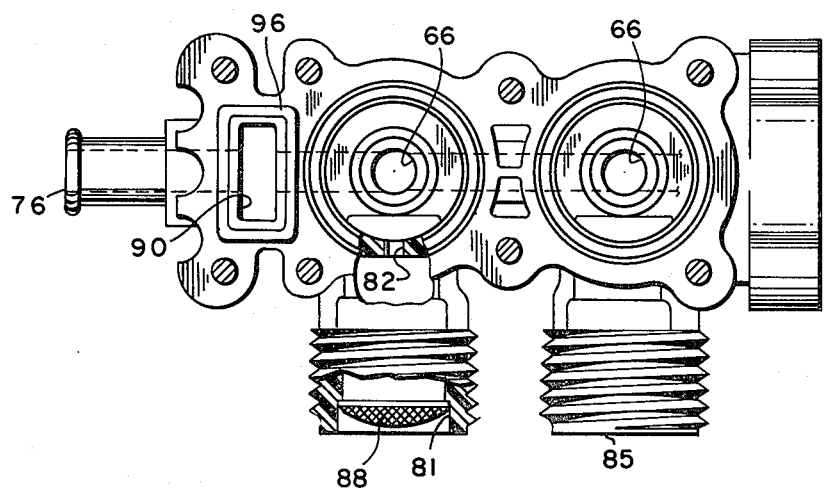

FLUID MIXING VALVE

BACKGROUND OF THE INVENTION

This invention relates to valves for mixing fluids and is particularly applicable to home appliances, such as dishwashers and washing machines where a range of different water temperatures are required.

DESCRIPTION OF THE PRIOR ART

A known thermal mixing valve presently in use incorporates a pair of solenoid actuated fluid valves connected respectively to individual hot and cold water inlets and a third solenoid valve downstream from a mixing chamber. Temperature sensitive power element mounted in the mixing chamber function to modulate the flow of hot and cold water into the mixing chamber to achieve a single predetermined mixed temperature upon actuation of the downstream solenoid. Valves of this type can also pass untempered hot or cold water upon selective actuation of either the hot or cold water solenoid.

Another known mixing valve having a three temperature capability incorporates individual hot and cold water to an outlet fluid passageway. By selectively actuating the two valves alone or simultaneously, three outlet temperatures are attained.

Recently, emphasis has been increasingly placed upon the need to reduce power usage in home appliances, particularly the energy used to heat water. There has, therefore, arisen a need for a fluid mixing valve which can provide a wider selection of fluid temperatures in order to accommodate some synthetic fabrics which must be washed at reduced water temperatures and to include therewith a cold water mode.

SUMMARY OF THE INVENTION

In the present invention a fluid mixing valve is provided which can selectively output five fluid temperatures at a controlled flow rate given a pressurized supply of hot and cold water. The novel mixing valve incorporates a hot water solenoid valve connected in line with a single pressurized hot water supply passageway and a pair of cold water solenoid valves connected to and fluidly in common with a single pressurized cold water supply passageway. Fluid flow control orifices are integrally molded into the valve housing downstream from each cold water solenoid valve seat and function to limit the flow rate of cold water therethrough to a predetermined rate. A hot water flow control orifice is integrally molded upstream from the hot water solenoid valve seat and in fluid communication with the hot water inlet passageway. The flow from each control orifice is selectively valved into a primary fluid passageway.

A resilient flow control member is located in a slot molded integrally into the valve housing adjacent an outlet fluid orifice of the primary fluid passageway for limiting the fluid flow rate through the valve. The primary fluid passageway also functions as a fluid mixing chamber for the fluid streams which converge therein.

By operating the solenoid valves either individually or in combination various temperature fluid flows are attained. Actuation of the hot water solenoid alone is effective for passing only hot water through the valve. Actuation of the hot water solenoid and the first cold water solenoid yields a first mix temperature which is a function of the hot water flow rate and its temperature and the cold water flow rate and its temperature. A second mix temperature is achieved by actuating all three solenoids which causes a stream of hot water, to mix with two streams of cold water in the primary fluid passageway. Actuation of the hot water solenoid and the second cold water solenoid provides a third mix temperature. Actuation of either the first or second cold water solenoids alone or simultaneously provides an outlet flow having a temperature equivalent to that of the cold water supply.

The valve of the present invention therefor selectively provides five different water temperature flows with only three solenoid valve members and without the need for costly thermostatic power elements and associated mounting components.

It is another feature of the invention to provide a thermal mixing valve which incorporates a valve housing having a unique configuration of fluid passageways which defines plural inlet fluid passageways, flow control orifices, a mixing chamber, a linking passageway between cold water passageways, and an outlet fluid orifice all of which are integrally molded into a unitary housing element.

BRIEF DESCRIPTION OF THE DRAWINGS

FIG. 1 is a view in elevation of the fluid mixing valve showing the location of the solenoid valves relative to the hot and cold inlets of the valve housing;

FIG. 2 is a cross-sectional view taken through lines 2—2 of FIG. 1 showing the solenoid valves structure and portions of the fluid passageways defined by the unitary valve housing;

FIG. 3 is a side elevational view taken along section lines 3—3 of FIG. 1;

FIG. 4 is a partial cross-sectional view taken along section lines 4—4 of FIG. 1 showing the hot water control orifice;

FIG. 5 is a partial cross-sectional view taken along lines 5—5 of FIG. 1 showing the linking passageway between the first and second cold water valve seats;

FIG. 6 is a partial cross-sectional view taken along line 6—6 of FIG. 3 showing the configuration of the unitary valve housing; and FIG. 7 is a partial cross-sectional view through lines 7—7 of FIG. 3 showing a side view of the plug seal and flow control washer in the valve.

DETAILED DESCRIPTION

Referring now to FIGS. 1 and 2, the invention is shown as including a valve housing indicated generally by reference numeral 10, a hot water solenoid valve assembly indicated generally at 12, a first cold water solenoid valve assembly indicated generally at 14, and a second cold water valve solenoid assembly indicated generally at 16. Solenoid valves 12 and 14 are connected to valve housing 10 by a U-shaped bracket 18 which is secured thereto by self-tapping screws 20. In the presently preferred practice, the housing is formed as an integral one-piece element molded of a suitable plastic material, as for example, nylon. Solenoid valve 16 is connected to housing 10 by a U-shaped bracket 22 which is secured thereto by screws 24. Solenoid valves 12, 14 and 16 are identical in basic construction and known in the art; therefore only valve assembly 12 will now be described in detail. Solenoid valve 12 includes a central pole piece 26 having a tubular configuration and formed of a suitable ferromagnetic material. The upper and lower ends of pole piece 26 register in corresponding holes provided in U-shaped bracket 18, thereby prohibiting lateral movement of the solenoid assembly. U-shaped brackets 18 and 22 are also formed of a ferromagnetic material and define in cooperation with central pole piece a continuous path of ferromagnetic material. The details of brackets 18 and 22 are typically shown and described in U.S. Pat. No. 3,591,130 assigned to the assignee of the present invention. A coil winding 28 is wound on a bobbin 30 which is formed of a suitable insulating material. A pair of terminals 32 extend outwardly from an encapsulating housing 34 which are molded integrally around the coil, winding bobbin, and pole piece. A non-magnetic guide member 36 extends part way into the bore defined by pole piece 26 and is formed of an insulating material. The lower end of guide member 36 includes an outwardly flanged portion 38 which has a tubular extension 40 formed around its periphery. As illustrated by FIG. 2, the lower end of each guide member is received in a bore 42 formed in housing 10. Guide member 36 is shown and described in greater detail in U.S. Pat. No. 3,593,956 assigned to the assignee of the present invention. A cylindrically shaped armature 44 formed of a ferromagnetic material is slidably received in guide member 36 and is continuously biased downwardly relative to FIG. 2 by a compression spring 46 which has its upper end seated against the closed end of guide member 36 and its lower end seated against the upper end of armature 44 and guided thereon by a cylindrical projection or pilot 48.

A valve seat 50 is defined by an annular rim portion of housing 10. An annular sealing groove 52 surrounds valve seat 50 and is defined by an annular surface portions of valve housing 10 and a counterbore and shoulder formed adjacent the end of tubular section 40.

A pressure operated pilot orifice controlled diaphragm valve assembly is indicated generally by reference numeral 54 and includes a flexible diaphragm 56 having a thickened annular rim portion 58 seated in groove 52. The clamping forces of screws 20 acting on bracket 18 and annular section 40 of guide 36 serve to compress the rim portion 58 of the diaphragm into sealing engagement with the surfaces of sealing groove 52.

A rigid valve insert member 60 is received through diaphragm 56 and includes an upper disc portion 62 and a lower cylindrical projection portion 64 which is slidably received in a fluid passageway 66 defined by valve housing 10. A plurality of bleed holes 68 extend through disc portion 62 and diaphragm 58 and fluidly communicate the areas above and below the diaphragm for equalizing the fluid pressure on either side thereof.

A secondary valve seat 70 is centrally located on the upper surface of disc portion 62. A pilot hole 72 is formed through insert 60 and is coaxial with valve seat 70. The lower end of armature 44 remains seated against secondary valve seat 70 under the urging of compression spring 46, thereby preventing fluid flow through pilot hole 72 as long as solenoid valve assembly 12 is de-energized. The above described diaphragm structure is known in the art and is described in greater detail in U.S. Pat. No. 3,593,957 assigned to the assignee of the present invention.

In operation, upon energization of solenoid valve 12 armature 44 is moved upwardly permitting fluid above the diaphragm to escape through pilot hole 72 at a flow rate greater than fluid beneath the diaphragm can pass upwardly through bleed holes 68. A differential pressure is then created across diaphragm assembly 54 causing it to move upwardly permitting fluid to flow from the space beneath the diaphragm through passageway 66.

De-energization of solenoid valve 12 results in armature 44 moving downwardly under the urging of spring 46 and into sealing engagement with valve seat 70, thereby permitting equalization of fluid pressures on either sides of the diaphragm and eventual sealing shut off of passageway 66. As is well known in the art, the sealing force acting upon diaphragm 54 is a function of the pressure differential between fluid in passageway 66 and fluid above the diaphragm acting upon the cross-sectional area of passageway 66 less the cross-sectional area of pilot hole 72.

With continued reference to FIG. 2, a primary fluid passageway 74 is defined by valve housing 10 and terminates at one end thereof in an outlet orifice 76. A flow control orifice 78 is in fluid communication with passageway 74 adjacent the right-hand end thereof and is axially aligned with cold water solenoid valve 16. A flow control orifice 80 is in fluid communication with passageway 74 and axially aligned with cold water solenoid valve 14.

A shown by FIGS. 4 and 6, hot water fluid inlet 81, connectable to a pressurized source of hot water, is defined by valve housing 10 and communicates with a flow control orifice 82. Fluid flowing therethrough enters the space beneath the diaphragm 56 of solenoid valve assembly 12. A cold water fluid inlet 85, connectable to a pressurized supply of cold water, fluidly communicates with the area under the diaphragm of solenoid valve assembly 14 and supplies fluid thereto and also supploies cold water to the area beneath the diaphragm of solenoid valve assembly 16 by means of a linking passageway 84 as shown by FIGS. 2 and 5.

As shown by FIG. 3 a screen filter 88 is seated within both hot water inlet 81 and cold water inlet 85.

As illustrated by FIGS. 2 and 6 a slot 90 is formed in valve housing 10 and has received therein a resilient flow control member 92 which has a centrally located flow control orifice axially aligned with pasageway 74.

A resilient plug seal 94 extends into slot 90 and functions to maintain flow control 92 in axial alignment with passageway 74. The upper end of plug seal 94 includes a gasket section 96 which registers in sealing engagement with a rectangularly extending groove 98 (see FIG. 6) in valve housing 10. Plug seal 94 is maintained in position in slot 90 by the clamping forces exerted from bracket 18.

In operation, the invention mixing valve has the capability of delivering five output flows each having a different temerature. It should be note that the invention valve can be used to mix incoming fluid streams which have differing chemical compositions in addition to varying temperatures. Flow mixing is achieved by energizing solenoid valves 12, 14 and 16 either individually or in various combinations, which opens the diaphragm valves permitting fluid to flow from the respective supply inlet, through orifice 66, and into passageway 74.

As described above, the hot water control orifice 82 is upstream from orifice 66 while cold water control orifices 78 and 80 are downstream therefrom. A flow of hot water untempered by mixing with cold water is obtained by energizing solenoid valve 12 which permits the already controlled flow of hot water at the supply temperature to flow past control orifice 82 and through passageways 66, into primary fluid passageway 74, past flow control washer 92, and through outlet orifice 76. During the straight hot water mode of valve operation solenoid valves 14 and 16 remain in the closed position thereby preventing entry of cold water into primary fluid passageway 74 and also preventing the escape of hot water past control orifices 80 and 78. It should be noted that for a given pressurized supply of hot water, control orifice 82 functions to limit the resultant flow rate therethrough to a predetermined flow rate.

In the preferred form of the invention orifices 78, 80 and 82 are sized approximately 0.100 inch (2.54 mm), 0.290 inch (8.34 mm), and 0.180 inch (4.57 mm), respectively. For a given 140 degrees F. (60.0 desgrees C.) hot water source connected to inlet 81 and a 60 degree F. (15.56 degrees C.) cold water source connected to inlet 85 the following outlet mixed temperature flows are attained in addition to unmixed hot and cold flows. The following values are based upon inlet fluid pressures in the range of 20 p.s.i to 120 p.s.i.

A first tempered or mix flow is obtained by energizing simultaneously solenoid valves 12 and 16 resulting in an outlet flow stream having a temperature of approximately 120 degrees F. (48.9 degrees C.) which is a function of the flow rates through orifices 82 and 78.

A second mix flow is obtained by energizing solenoid 12 and solenoid 14 resulting in an outlet flow stream having a temperature of approximately 96 degrees F. (35.6 degrees C.) which is a function of the flow rates through orifices 82 and 80.

A third mix flow is obtained by energizing solenoids 12, 14, and 16 resulting in a fluid stream having a temperature of approximately 93 degrees F. (33.9 degrees C.).

Straight cold water flow is obtained by energizing either solenoid valve 14 or 16 or by energizing them simultaneously.

Flow control 92 insures that the resultant outlet flow stream through passageway 74 is substantially limited to a predetermined maximum flow rate and also functions to prevent pressure surges.

It will be understood to those having ordinary skill in the art that modifications and variations of the invention may be made without departing from the scope of the invention which is described in the following claims.

I claim:

1. A fluid mixing valve connectable to a plurality of pressurized fluid sources, said mixing valve comprising:
   (a) housing means, said housing means including an integrally formed, one piece member defining,
      (i) a primary fluid passageway,
      (ii) a first fluid inlet in fluid communication with said primary passageway,
      (iii) a second fluid inlet in fluid communication with said primary passageway,
      (iv) a first flow restricting orifice in the path of fluid flow through said first inlet,
      (v) a second flow restricting orifice in the path of fluid flow through said second inlet,
      (vi) a linking passageway in fluid communication with said second fluid inlet and said primary passageway, said linking passageway in fluid communication with said second inlet at a location upstream from said second flow restricting orifice, said linking passageway having a portion axially aligned with said primary passageway,
      (vii) a third flow restricting orifice in the path of fluid flow through said linking passageway; and
   (b) valve means operably connected to said housing means at a location fluidly in common with each of said first inlet, said second inlet at a location downstream from said point of communication of said linking passageway and said linking passageway, for individually valving fluid flowing therepast to said primary passageway, each of said valve means being selectively actuable for varying the composition of flow to said primary fluid passageway, thereby varying the properties of flow through said outlet orifice.

2. The valve as defined in claim 1, further including a resilient flow control member disposed in said primary fluid passageway for substantially controlling the fluid flow through said outlet orifice.

3. The device as defined in claim 1, wherein said first flow restricting orifice is upstream from said valve means.

4. The device as defined in claim 1, wherein said valve means in fluid communication with said second inlet and said linking passageway are pilot operated valves having diaphragm valve members, said diaphragm valve members having lower surface portions in fluid communication with said second inlet and said linking passageway.

* * * * *